(12) United States Patent
Vladuchick et al.

(10) Patent No.: US 9,991,064 B2
(45) Date of Patent: Jun. 5, 2018

(54) SF6 INSULATED CIRCUIT BREAKER SYSTEM WITH THERMAL CAPACITOR

(71) Applicant: ABB Schweiz AG, Baden (CH)

(72) Inventors: Paul Vladuchick, Cranberry Township, PA (US); Matthew Cuppett, Uniontown, PA (US); Mauricio Aristizabal, Pittsburgh, PA (US)

(73) Assignee: ABB Schweiz AG, Baden (CH)

( * ) Notice: Subject to any disclaimer, the term of this patent is extended or adjusted under 35 U.S.C. 154(b) by 0 days. days.

(21) Appl. No.: 15/233,620

(22) Filed: Aug. 10, 2016

(65) Prior Publication Data
US 2018/0047525 A1   Feb. 15, 2018

(51) Int. Cl.
*H01H 9/30*   (2006.01)

(52) U.S. Cl.
CPC ..................................... *H01H 9/30* (2013.01)

(58) Field of Classification Search
CPC ........... H01H 13/705; H01H 2003/008; H01H 2037/769; H01H 2217/00; H01H 2217/038; H01H 37/765; H01H 3/02
See application file for complete search history.

(56) References Cited

U.S. PATENT DOCUMENTS

| | | | | |
|---|---|---|---|---|
| 4,006,332 | A * | 2/1977 | Crookston | H02B 13/035 218/83 |
| 4,434,335 | A | 2/1984 | Natsui et al. | |
| 5,367,134 | A * | 11/1994 | Yoshizumi | H01H 33/34 218/84 |
| 5,828,026 | A | 10/1998 | Brühl et al. | |
| 7,102,101 | B1 * | 9/2006 | Johnson | H01H 33/562 219/201 |
| 7,893,379 | B2 | 2/2011 | Schoenemann et al. | |
| 2014/0069891 | A1 * | 3/2014 | Otani | H01H 33/7046 218/46 |
| 2015/0060411 | A1 * | 3/2015 | Yamashita | H01H 33/903 218/158 |
| 2016/0363384 | A1 * | 12/2016 | Whitney | F28D 7/024 |
| 2017/0372857 | A1 * | 12/2017 | Vladuchick | H01H 33/64 |

FOREIGN PATENT DOCUMENTS

| | | |
|---|---|---|
| CN | 201242969 Y | 5/2009 |
| EP | 2455957 B1 | 3/2014 |

* cited by examiner

*Primary Examiner* — Truc Nguyen
(74) *Attorney, Agent, or Firm* — Taft Stettinius & Hollister LLP; J. Bruce Schelkopf

(57) ABSTRACT

A sulfur hexafluoride (SF6) insulated circuit breaker system has a tank constructed to hold a quantity of SF6; a circuit breaker having contacts insulated by the SF6; a heater operative to supply heat to the SF6; and a thermal capacitor in conductive engagement with the tank, and operative to store heat energy and constructed to conduct the heat energy to the SF6 in the tank. A thermal energy storage system for a sulfur hexafluoride (SF6) insulated circuit breaker system having a tank storing a quantity of SF6 includes a thermal capacitor operative to store heat energy and constructed to engage the tank and conduct the heat energy to the SF6 in the tank.

21 Claims, 2 Drawing Sheets

US 9,991,064 B2

SF6 INSULATED CIRCUIT BREAKER SYSTEM WITH THERMAL CAPACITOR

TECHNICAL FIELD

The present application generally relates to circuit breakers, and more particularly, but not exclusively, to a sulfur hexafluoride (SF6) insulated circuit breaker system with a thermal capacitor.

BACKGROUND

Electrical systems of various types, e.g., circuit breaker systems, remain an area of interest. Some existing systems have various shortcomings, drawbacks and disadvantages relative to certain applications. For example, in some SF6 insulated circuit breaker systems, low ambient temperatures may precipitate a lockout state of the circuit breaker too quickly. Accordingly, there remains a need for further contributions in this area of technology.

SUMMARY

One embodiment of the present invention is a unique sulfur hexafluoride (SF6) insulated circuit breaker system having a thermal capacitor. One embodiment is a unique thermal energy storage system for an SF6 insulated circuit breaker system. Other embodiments include apparatuses, systems, devices, hardware, methods, and combinations for SF6 insulated circuit breaker systems. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
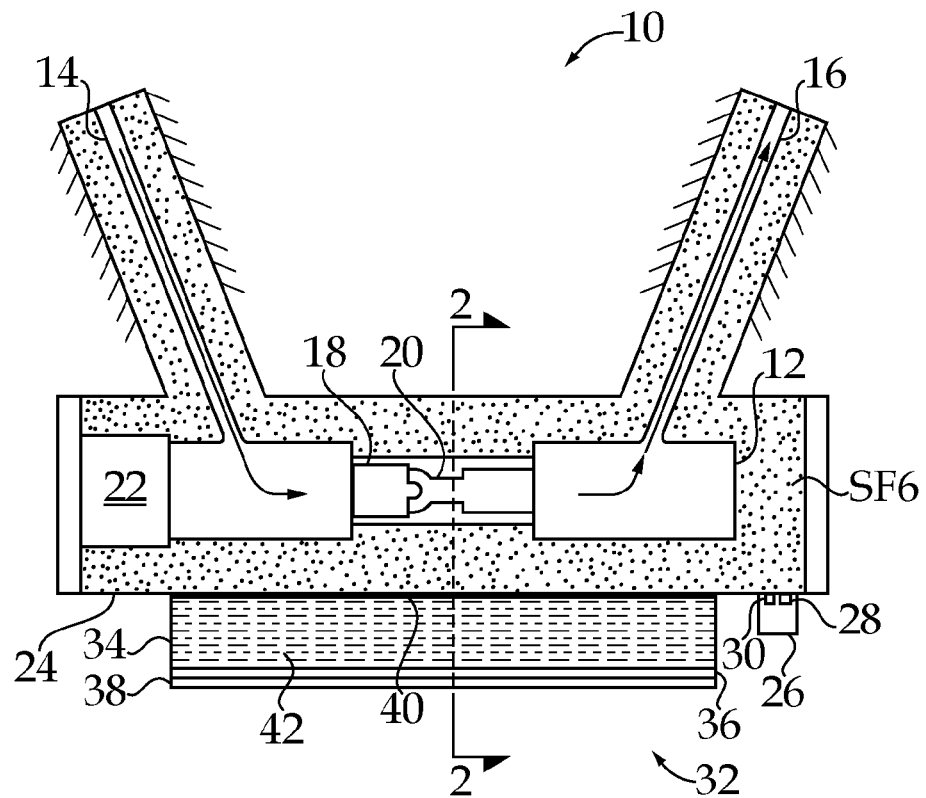
FIG. 1 schematically illustrates some aspects of a non-limiting example of a sulfur hexafluoride (SF6) insulated circuit breaker system in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, some aspects of a non-limiting example of a sulfur hexafluoride (SF6) insulated circuit breaker system 10 in accordance with an embodiment of the present invention are schematically illustrated. In one form, circuit breaker system 10 employs an SF6 dielectric gas puffer system to force pressurized SF6 between the circuit breaker contacts during circuit interruption (opening of the contacts). In other embodiments, circuit breaker system 10 may employ any suitable SF6 arc quenching system, e.g., circuit breaker system 10 may be a self-blast system. Circuit breaker system 10 includes a circuit breaker 12 having conductors 14 and 16; contacts 18 and 20 and a system 22 for operating contacts 18 and 20; a tank 24 constructed as a reservoir to hold a quantity of SF6; a density monitor 26 including a temperature sensor 28 and a pressure sensor 30; and a thermal energy storage system 32.

Contacts 18 and 20 are operated by system 22 to selectively make and break electrical current paths to respectively allow and interrupt current flow through conductors 14 and 16. Contacts 18 and 20 are insulated by SF6 from tank 24 for arc quenching. In one form, contacts 18 are double motion contacts. In other embodiments, single motion contacts may be employed. Tank 24 is constructed to store SF6, and to act as a reservoir for the SF6. In the illustrated embodiment, contacts 18 and 20 are disposed within tank 24. In other embodiments, contacts 18 and 20 may be located outside of tank 24, and may be supplied with SF6 from tank 24.

Density monitor 26 is operative to determine and monitor the density of the SF6 gas in tank 24. Under normal conditions, SF6 functions as an electrical insulator, an interrupting media to quench arcing, and a mechanical damper for contacts 18 and 20 in circuit breaker 12. The SF6 is stored in tank 24 under pressure at typical temperatures, e.g., room temperature. Under some conditions of low temperature, e.g., from −30° C. to −50° C. or lower, the SF6 gas in tank 24 can experience liquefaction, wherein some of the SF6 gas becomes a liquid. Liquefaction of some of the SF6 gas reduces the density of the gaseous SF6 in the tank that is used for quench arcing, e.g., during the opening of contacts 18 and 20. In one form, density monitor 26 employs using temperature sensor 28 and a pressure sensor 30 to determine the density of the SF6 gas in tank 24.

Density monitor 26 is operative to indicate a state associated with the density of the SF6 gas in tank 24, which varies with the temperature of the SF6 gas in tank 24. If the SF6 gas in tank 24 has sufficient density for normal arc quenching operation without undue damage to contacts 18, density monitor 26 outputs a signal indicating a nominal state. If the SF6 gas density is lower than a first predetermined density level, density monitor 26 outputs a signal indicating an alarm state, e.g., to indicate to the operator of circuit breaker system 10 that service is required, e.g., to supply heat to tank 24, although in some cases the alarm state may also be used to indicate the need to replenish the supply of SF6 in tank 24 or take other measures to increase the density of the SF6 in tank 24. If the SF6 gas density drops to a second predetermined density level below that associated with the alarm state, density monitor 26 outputs a signal representing a lockout state. In one form, the lockout state occurs when the SF6 temperature is −33° C., i.e., the lockout temperature of the SF6 is −33° C. In other embodiments, other temperatures may be used to designate a lockout state. The density levels associated with the nominal state, the alarm state and the lockout state may vary with the needs of the particular application, and are known to those skilled in the art. In some embodiments, when in the lockout state, circuit breaker system 10 allows a single occurrence of a circuit interruption, i.e., allows contacts 18 and 20 to be opened a single time, but does not allow contacts 18 and 20 to be closed or subsequently closed, or does not allow charging of springs, pistons or other devices used to close contacts 18 and 20 until reset of the lockout state. In some embodiments, once in the lockout state, circuit breaker system 10 does not allow either opening or closing of contacts 18 and 20 until reset of the lockout state.

Thermal energy storage system 32 includes a thermal capacitor 34. In some embodiments, thermal energy storage system also includes a heater 36 and insulation 38. In other embodiments, circuit breaker system 10 may include a heater disposed on or within tank 34, and may include insulation disposed about tank 24, in addition to or in place of heater 36 and insulation 38. Thermal capacitor 34 is in conductive engagement with tank 24, and operative to store heat energy. In one form, thermal capacitor 34 is bolted to bosses on tank 24 (not shown), In other embodiments, thermal capacitor 34 may be attached to tank 24 using straps, clamps or other fastening systems or devices, or in some embodiments may be integral with tank 24. Thermal capacitor 34 is constructed to conduct the stored heat energy to the SF6 in tank 24, e.g., via conduction through the walls of tank 24. Thermal capacitor 34 is operative to increase the thermal mass of circuit breaker system 10, and to increase the thermal time constant of circuit breaker system 10. In one form, thermal capacitor 34 is metallic. In other embodiments, thermal capacitor 34 may be nonmetallic. In one form, thermal capacitor 34 is an aluminum casting. In other embodiments, other materials and/or methods of forming thermal capacitor 34 may be employed, e.g., thermal capacitor 34 may be a weldment.

Heater 36 is coupled to thermal capacitor 34. Heater 36 is operative to supply heat to thermal capacitor 34, and to supply heat to the SF6 disposed in tank 24, e.g., via thermal capacitor 34, in order to achieve and maintain the SF6 gas in tank 24 at or above a desired temperature or density value suitable for quenching arcs between contacts 18 and 20. In one form, heater 36 is a plurality of cartridge heater elements (cartridge heaters), e.g., coupled to thermal capacitor 34. In other embodiments, heater 36 may be strip heater elements (strip heaters) or any suitable type of heater(s) coupled to thermal capacitor 34. In some embodiments, heater 36 may be disposed inside thermal capacitor 34, or may be disposed between thermal capacitor 34 and tank 24. Insulation 38 is disposed about thermal capacitor 34, e.g., preferably at least to the extent necessary to cover heater 36. Some embodiments may not include insulation 38. In some embodiments, insulation 38 may extend all the way around the outer portions of thermal capacitor 34, except where thermal capacitor 34 is in contact with tank 24. Insulation 38 may be, for example, an insulation blanket wrapped partially around thermal capacitor 34.

Figure 2:
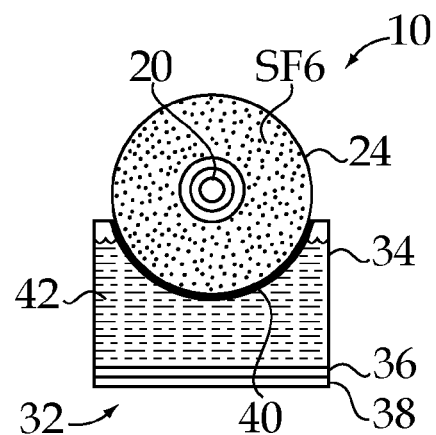
FIG. 2 schematically illustrates some aspects of a non-limiting example of the SF6 insulated circuit breaker system of FIG. 1 in accordance with an embodiment of the present invention.
Figure 3:
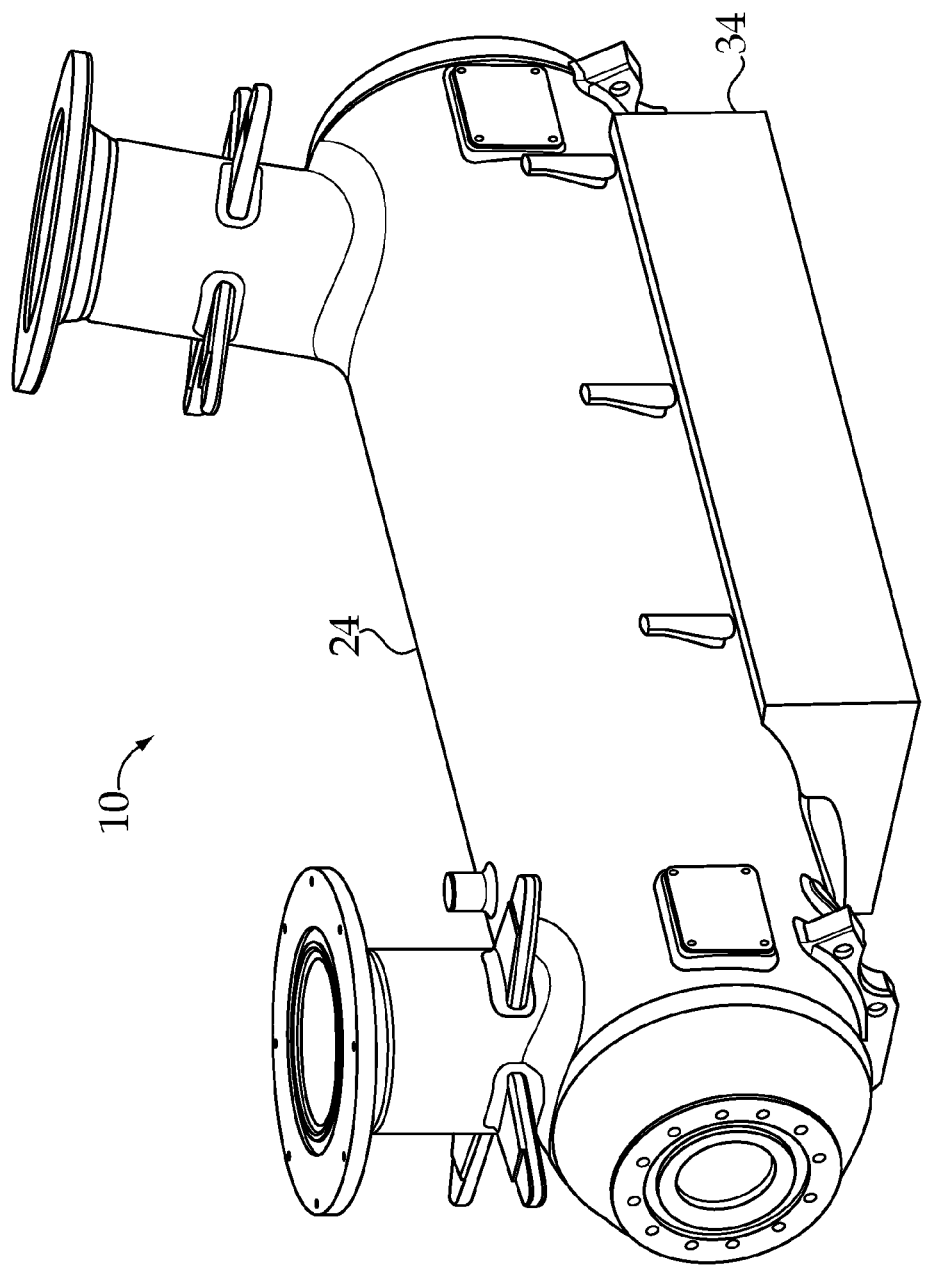
FIG. 3 schematically illustrates some aspects of a non-limiting example of an SF6 insulated circuit breaker system in accordance with an embodiment of the present invention.

Referring to FIGS. 2 and 3, some aspects of non-limiting examples of tank 24 and thermal capacitor 34 in accordance with some embodiments of the present invention are illustrated. In the illustrated embodiments, thermal capacitor 34 is constructed to partially wrap around tank 24, e.g., to increase heat conduction between tank 24 and thermal capacitor 34. In some embodiments, thermal energy storage system 32 includes a heat conduction medium or conductive medium 40. Conductive medium 40 is configured to increase heat conduction from tank 24 to thermal capacitor 34 and the SF6 stored in tank 24. In one form, conductive medium 40 is disposed between thermal capacitor 34 and tank 24. In some embodiments, conductive medium 40 may extend into thermal capacitor 34 and/or tank 24. In one form, conductive medium 40 is a thermal grease. In other embodiments, conductive medium 40 may be a thermal paste, a thermal compound or any material, structure or device that is operative to conduct heat between thermal capacitor 34 and tank 24, or between thermal capacitor 34 and the SF6 stored in tank 24.

In one form, thermal capacitor 34 is hollow. In other embodiments, thermal capacitor 34 may be solid. In one form, thermal capacitor 34 includes a heat storage material 42 disposed within thermal capacitor 34. In one form, heat storage material 42 is operative to supply latent heat to the SF6, e.g., via tank 24. In other embodiments, heat storage material 42 may not be operative to supply latent heat to the SF6. In one form, heat storage material 42 is a paraffin wax. In other embodiments, other materials may be employed. The paraffin wax of the present embodiment has a melting point of 60° C. In other embodiments, paraffin waxes having other melting points may be employed. When the paraffin wax solidifies, it's volume decreases by approximately 13%. During production, thermal capacitor 34 is filled with the paraffin wax in a liquid form. Upon solidification, the pressure inside thermal capacitor 34 reduces, e.g., to sub atmospheric. In some embodiments, the pressure inside thermal capacitor 34 may be a near or partial vacuum upon solidification of the paraffin wax. In some embodiments, risers or other geometric features of thermal capacitor 34 may be employed to form air pockets, so that the pressure swings inside thermal capacitor 34 stemming from the paraffin wax phase changes are reduced, thereby reducing cyclic stresses in thermal capacitor 34. In some embodiments, vents, breathers, or other features/devices/systems may be employed to maintain a desirable pressure or pressure range within thermal capacitor 34 without regard to the paraffin wax phase changes.

In certain regions, the requirements for circuit breaker systems such as circuit breaker system 10 include that at ambient temperatures of −60° C., upon the failure of the heaters or the power supply to the heaters, the circuit breaker system must continue to function for at least two (2) hours prior to entering the lockout state. Accordingly, thermal storage system 32 and thermal capacitor 34 are configured to store enough heat energy to prevent a lockout state of the circuit breaker system due to liquefaction of the SF6 in −60° C. ambient temperature conditions for at least two (2) hours.

In an experiment, an embodiment of circuit breaker system 10 with thermal energy storage system 32 exposed to −60° C. ambient temperature conditions went from a starting point at 150° C. paraffin wax temperature and −10° C. SF6 temperature to a lockout SF6 temperature of −33° C. in approximately 3.5 hours. The experiment commenced with the shutting off of power to heater 36. During the experiment, the temperature of the SF6 decreased from the initial value of −10° C. as the paraffin wax temperature decreased, and then stabilized at a temperature above lockout temperature during the phase change of the paraffin wax from liquid to solid at a wax temperature of 60° C. as the latent heat of fusion was supplied to the SF6 from the paraffin wax. After solidification of the wax, the SF6 temperature then continued to decrease as the wax temperature decreased, until reaching lockout temperature approximately 3.5 hours after the start of the test. The thermal capacitor 34 used in the test held approximately 25 kg of paraffin wax. The paraffin wax returned 201 J/g of heat during the phase change. The same circuit breaker system minus thermal energy storage system 32 took less than one hour to go from a −10° C. SF6 temperature to a lockout SF6 temperature of −33° C. in ambient temperature conditions of −40° C. Thus, it is seen that the addition of thermal energy storage system 32 substantially increased the thermal mass and thermal time constant of the circuit breaker system, thereby improving the ability of the circuit breaker system to maintain operation above an SF6 lockout temperature in low ambient temperature conditions. By causing the SF6 to cool more slowly, more time is available for the operator of the circuit breaker system to take measures to prevent the circuit breaker system from reaching the lockout state.

Embodiments of the present invention include a sulfur hexafluoride (SF6) insulated circuit breaker system, comprising: a tank constructed to hold a quantity of SF6; a circuit breaker having contacts insulated by the SF6; a heater operative to supply heat to heat the SF6; a thermal capacitor in conductive engagement with the tank, and operative to store heat energy and constructed to conduct the heat energy to the SF6 in the tank.

In a refinement, the heater is coupled to the thermal capacitor and operative to supply heat to the SF6 via the thermal capacitor.

In another refinement, the thermal capacitor is constructed to at least partially wrap around the tank.

In yet another refinement, the thermal capacitor is metallic.

In still another refinement, the thermal capacitor is hollow.

In yet still another refinement, the thermal capacitor includes a material operative to supply a latent heat to the SF6.

In a further refinement, the material is paraffin wax.

In a yet further refinement, the SF6 insulated circuit breaker system further comprises a heat conduction medium disposed between the thermal capacitor and the tank.

In a still further refinement, an insulator disposed at least partially about the thermal capacitor.

In a yet still further refinement, the thermal capacitor is constructed to store enough heat energy to prevent a lockout state of the circuit breaker due to liquefaction of the SF6 in −60° C. ambient temperature conditions for at least two (2) hours.

Embodiments of the present invention include a thermal energy storage system for a sulfur hexafluoride (SF6) insulated circuit breaker system having a tank storing a quantity of SF6, comprising: a thermal capacitor operative to store heat energy and constructed to engage the tank and conduct the heat energy to the SF6 in the tank.

In a refinement, the thermal energy storage system further comprises a heater is coupled to the thermal capacitor and operative to supply heat to the SF6 via the reservoir.

In another refinement, the thermal capacitor is constructed to at least partially wrap around the tank.

In yet another refinement, the thermal capacitor is metallic.

In still another refinement, the thermal capacitor is hollow.

In yet still another refinement, the thermal capacitor includes a material operative to supply a latent heat to the SF6.

In a further refinement, the material is paraffin wax.

In a yet further refinement, the thermal energy storage system further comprises a heat conduction medium disposed between the thermal capacitor and the tank.

In a still further refinement, the thermal energy storage system further comprises an insulator disposed at least partially about the thermal capacitor.

Embodiments of the present invention include a sulfur hexafluoride (SF6) insulated circuit breaker system, comprising: a tank constructed to hold a quantity of SF6; a circuit breaker having contacts insulated by the SF6; a heater operative to supply heat to heat the SF6; means for storing heat and transmitting heat to the SF6 and delaying liquefaction of the SF6 in the tank in low ambient temperature conditions.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A sulfur hexafluoride (SF6) insulated circuit breaker system, comprising:
   a tank having a wall and being constructed to hold a quantity of SF6 using the wall;
   a circuit breaker having contacts insulated by the SF6;
   a heater operative to supply heat to heat the SF6;
   a thermal capacitor in conductive engagement with the tank, and operative to store heat energy and constructed to conduct the heat energy to the SF6 in the tank via conduction through the wall of the tank.

2. The SF6 insulated circuit breaker system of claim 1, wherein the heater is coupled to the thermal capacitor and operative to supply heat to the SF6 via the thermal capacitor.

3. The SF6 insulated circuit breaker system of claim 1, wherein the thermal capacitor is constructed to at least partially wrap around the tank.

4. The SF6 insulated circuit breaker system of claim 1, wherein the thermal capacitor is metallic.

5. The SF6 insulated circuit breaker system of claim 1, further comprising a conductive medium disposed between the thermal capacitor and the tank.

6. The SF6 insulated circuit breaker system of claim 1, further comprising an insulator disposed at least partially about the thermal capacitor.

7. The SF6 insulated circuit breaker system of claim 1, wherein the thermal capacitor is constructed to store enough heat energy to prevent a lockout state of the circuit breaker in −60° C. ambient temperature conditions for at least two (2) hours.

8. The SF6 insulated circuit breaker system of claim 1, further comprising a conductive medium disposed between the thermal capacitor and the tank.

9. The SF6 insulated circuit breaker system of claim 1, wherein the thermal capacitor is hollow.

10. The SF6 insulated circuit breaker system of claim 9, wherein the thermal capacitor includes a material operative to supply a latent heat to the SF6.

11. A sulfur hexafluoride (SF6) insulated circuit breaker system, comprising:
    a tank constructed to hold a quantity of SF6;
    a circuit breaker having contacts insulated by the SF6;
    a heater operative to supply heat to heat the SF6;
    a thermal capacitor in conductive engagement with the tank, and operative to store heat energy and constructed to conduct the heat energy to the SF6 in the tank, wherein the thermal capacitor is hollow;

wherein the thermal capacitor includes a material operative to supply a latent heat to the SF6; and wherein the material is a paraffin wax.

12. A thermal energy storage system for a sulfur hexafluoride (SF6) insulated circuit breaker system having a tank storing a quantity of SF6, the tank having a wall for holding the SF6, comprising: a thermal capacitor operative to store heat energy and mounted externally on the tank, and constructed to engage the tank and conduct the heat energy to the SF6 in the tank via conduction through the wall of the tank.

13. The thermal energy storage system of claim 12, further comprising a heater is coupled to the thermal capacitor and operative to supply heat to the SF6 via the thermal capacitor.

14. The thermal energy storage system of claim 12, wherein the thermal capacitor is constructed to at least partially wrap around the tank.

15. The thermal energy storage system of claim 12, wherein the thermal capacitor is metallic.

16. The thermal energy storage system of claim 12, wherein the thermal capacitor is hollow.

17. The thermal energy storage system of claim 16, wherein the thermal capacitor includes a material operative to supply a latent heat to the SF6.

18. A thermal energy storage system for a sulfur hexafluoride (SF6) insulated circuit breaker system having a tank storing a quantity of SF6, comprising: a thermal capacitor operative to store heat energy and constructed to engage the tank and conduct the heat energy to the SF6 in the tank, wherein the thermal capacitor is hollow;

wherein the thermal capacitor includes a material operative to supply a latent heat to the SF6; and wherein the material is paraffin wax.

19. The thermal energy storage system of claim 12, further comprising a heat conduction medium disposed between the thermal capacitor and the tank.

20. The thermal energy storage system of claim 12, further comprising an insulator disposed at least partially about the thermal capacitor.

21. A sulfur hexafluoride (SF6) insulated circuit breaker system, comprising:

a tank constructed to hold a quantity of SF6;

a circuit breaker having contacts insulated by the SF6;

a heater operative to supply heat to heat the SF6;

a thermal capacitor for storing heat and transmitting heat to the SF6 and delaying liquefaction of the SF6 in the tank in low ambient temperature conditions, wherein the thermal capacitor of storing heat and transmitting heat is disposed external to the tank and is in direct conductive engagement with the tank.

* * * * *